April 12, 1938.　　　A. P. DAVIS　　　2,114,248
MOTION REPRODUCING MECHANISM
Original Filed Dec. 10, 1932
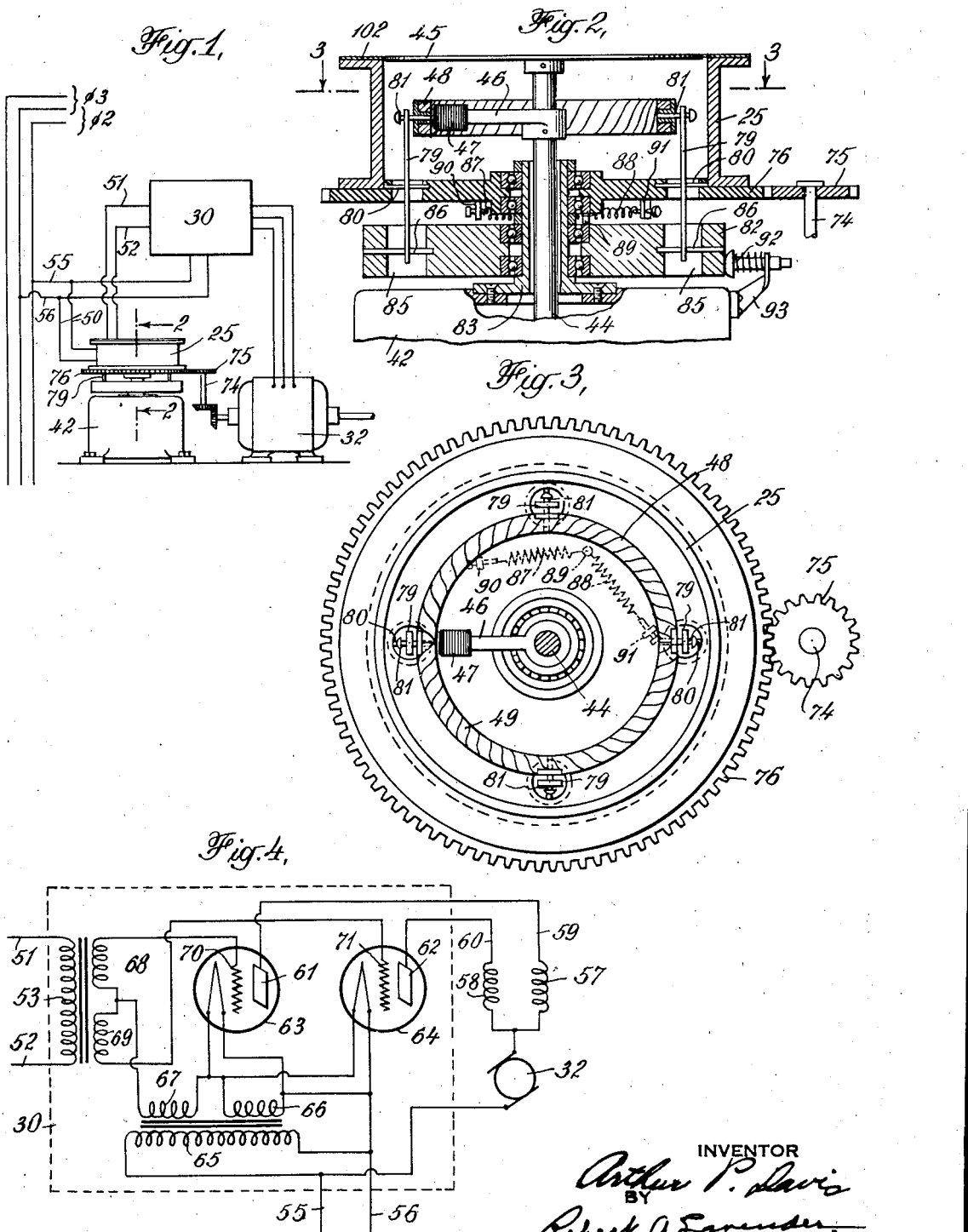
INVENTOR
Arthur P. Davis
BY
Robert A. Sonander
ATTORNEY Patented Apr. 12, 1938

2,114,248

UNITED STATES PATENT OFFICE 2,114,248

MOTION REPRODUCING MECHANISM

Arthur P. Davis, New York, N. Y., assignor to Arma Engineering Co., Inc., New York, N. Y., a corporation of New York Original application December 10, 1932, Serial No. 646,607. Divided and this application November 12, 1937, Serial No. 174,242

5 Claims. (Cl. 172—239)

This invention relates to motion reproducing mechanism and has particular reference to mechanism for reproducing the movement of a control member by a follow-up member driven by a prime mover. The present application is a division of copending application Serial No. 646,607, filed December 10, 1932.

In a prior type of motion reproducing mechanism, the displacement between electrically co-operating control elements, severally connected to the control and driven members, produces an electrical effect, which is impressed on a prime mover such as an electric motor operatively connected to the driven member and tending to restore the latter to substantial positional agreement with the control member. Even with anti-hunting devices, due to mechanical causes, the electrical control element of the driven member lags somewhat behind the electrical control element of the control member, so that they are not brought into exact positional agreement and this lag will sustain oscillation or hunting between the members, which impairs the accuracy of the mechanism, sets up disturbing vibrations and unnecessarily prolongs the follow-up movement.

In accordance with the present invention, a motion reproducing mechanism is provided which automatically compensates for the mechanical lag between the control and driven members in accordance with the acceleration of the prime mover driving the driven member.

In the mechanism of this invention, this lag compensation is effected by automatically advancing the electrical control element of the driven member by an amount which exactly proportionately offsets the lag and maintains the proper relative positions of the electrical control elements at all times and under all conditions to procure true and accurate reproduction by the driven member of the motion of the control member.

This advance of the electrical control element of the driven member in the manner described is preferably obtained by means including a device for creating a torque on the said electrical control element proportional to the acceleration of the prime mover driving the driven member. The degree of advance of the electrical control element of the driven member increases with acceleration in either direction and decreases with decrease in acceleration.

For a more complete understanding of the invention, reference may be had to the accompanying drawing, in which:

Figure 1 illustrates schematically the motion reproducing mechanism of this invention;

Fig. 2 illustrates the control and indicating device shown in axial section as seen along the line 2—2 of Fig. 1;

Fig. 3 is a transverse section through control and indicating device as seen along the line 3—3 of Fig. 2; and, Fig. 4 illustrates schematically the vacuum tube and control circuit for the prime mover.

Referring to the drawing, numeral 42 designates an electric motor such as the receiver of an electrical transmission system of the self-synchronizing type for transmitting the movement of the control member whose position it is desired to reproduce. The motion receiving member is a shaft 44 driven by motor 42 and may carry a suitably inscribed indicator dial 45 which cooperates with a concentric index ring 102 mounted on an indicator housing 25 supported on the gear 76 journalled on the bushing member 83 extending upwardly from the housing of the motor 42. Gear 76 is driven by a pinion 75 mounted on shaft 74 geared to the prime mover 32, preferably an electric motor, for driving the object which follows the movement of the control member. For the purposes of this disclosure, gear 76 may be considered the driven member.

As is illustrated particularly in Figs. 2 and 3, secured on motion receiving shaft 44 is an arm 46 carrying the follow-up magnet 47, which moves in a circle in inductive relation to the follow-up coils 48 and 49, which are semi-circular in shape and are pivotally supported at spaced points 81 by several vertical arms 79 extending through apertures in gear 76 and pivoted thereon by pins 80, so that coils 48 and 49 are rotatable as a unit with respect to supporting gear 76 and follow-up magnet 47.

Positioned below gear 76 and journalled on bushing member 83 is a heavy disc 82 having openings 85 across which project pins 86 engaging slots in the lower ends of the arms 79. This disc 82 is connected to gear 76 by opposed springs 87 and 88 fastened at their adjacent ends to a pin 89 on disc 82 and at their outer ends to the pins 90 and 91 on the gear 76. The fastenings at the outer ends are adjustable as shown, so that the opposite pull of the springs can be relatively adjusted to accurately center the disc and plate with relation to each other and to precisely predetermine the exact position of the coils 48 and 49. A drag or damping effect is exerted on the disc 82 by an adjustable spring-pressed shoe 92 carried on bracket 93 of the motor 42 frame.

The follow-up magnet 47 is energized through slip rings, not shown, and conductors 50 from a phase, for instance φ 2 of the three-phase supply. In normal neutral position, the follow-up magnet 47 is on the center line between the follow-up coils 48 and 49, so that equal and opposite voltages are developed in these coils, which are connected in opposed and bucking relation and in series through conductors 51 and 52 with the control coil 53 of the tube box 30. This control coil 53 is connected in any desired manner to operate the prime mover motor 32 in opposite directions to move the gear 76 correspondingly.

In the circuits shown in Fig. 4 current is supplied to the motor 32 from phase φ 2 through conductors 55 and 56. Conductor 55 is connected to one brush of the motor commutator, the other brush of which is connected through the alternate series fields 57 and 58 and conductors 59 and 60 to the plates 61 and 62 of vacuum tubes 63 and 64, respectively. A primary winding 65 across conductors 55 and 56 has one secondary winding 66 supplying the filament current for the tubes and another secondary winding 67 connected through coils 68 and 69 to grids 70 and 71, respectively, of the tubes 63 and 64.

Current on one direction through control coil 53, reducing the bias on the corresponding grid 70 or 71, will cause current to flow in series through the motor 32 armature and the corresponding series field 57 or 58 to turn the motor 32 in one direction. Current in reverse direction in control coil 53 will operate the motor 32 in the opposite direction and the motor operation will continue in either direction until the follow-up magnet 47 and the follow-up coils 48 and 49 are returned to normal neutral relation, thus reducing the current through coil 53 to zero.

In operation of the motion reproducing mechanism of this invention, movement of the motion receiving shaft 44 by the motor 42 displaces follow-up magnet 47 from the neutral position on the center line between the follow-up coils 48 and 49, to a position opposite one of these coils, developing a voltage therein, which is of the sign determined by the direction of the displacement. Resulting energization of motor 32 causes the latter to drive the gear 76 and its supported follow-up coils in the direction of the displacement of follow-up magnet 47, so that the coils move with the magnet.

Due to the spring, inertia and friction between the drive motor 32 and the follow-up coils 48 and 49, these coils will lag somewhat behind a true position corresponding to the position of follow-up magnet 47. Such lag will tend to sustain oscillation or hunting between the coils and the magnet 47 when the coils 48 and 49 finally catch up, and such lagging and hunting are very objectionable in disturbing and interfering with the accuracy of the mechanism and in setting up vibrations unduly prolonging the follow-up movement of the mechanism parts. To overcome these objections the mechanism of this invention provides on the support for the coils 48 and 49 a device for effecting an automatic advance of the follow-up coils exactly proportionately offsetting the lag and maintaining the proper relative position of the follow-up magnet 47 and the coils 48 and 49 at all times and under all conditions.

Thus, when the gear 76 is returned by the pinion 75 of the restoring mechanism, the acceleration of the gear 76 in either direction will correspondingly tilt the arms 79 and rotate the coils 48 and 49 slightly in advance of the rotation of gear 76. This advancing of the follow-up coils 48 and 49 will increase with acceleration in either direction and will decrease with decrease in acceleration. Under conditions of no acceleration, the relative displacement will depend upon the drag exerted by the friction device 92 and the adjustments may be such as to just counteract the lag due to the spring and friction involved. For normal operation, where the acceleration forces are small, the displacement produced is negligibly small, and therefore the effect is to closely counterbalance the factors causing hunting in a way to anticipate and avoid these objectionable oscillations.

It will be seen that with the mechanism of this invention, no lag is introduced under normal operating conditions where the maximum speeds are comparable to the maximum speed of the prime mover. Under these normal operating conditions, however, the maximum acceleration forces are small compared to the acceleration forces such as are brought into play when operation of the mechanism is rapidly initiated. An anti-hunting device operating, for instance, as a function of the velocity, tends to introduce more lag than one operating as a function of acceleration. In fact, it is theoretically possible so to proportion an anti-hunting device of the present type, operating as a function of acceleration, that the lag or lead is zero. This follows from the consideration of the factors that produce hunting. If there were no spring and friction between the prime mover and the electrical control element of the driven member, the mechanism would not sustain oscillations. Spring and friction, however, cause a displacement of the electrical control element in such a direction as to sustain an oscillation. An anti-hunting device producing displacement of the follow-up coil determined by the same factors of spring and friction, but in the opposite direction, destroys the tendency of the mechanism to sustain an oscillation and, by over-compensation, the mechanism can be brought to rest with substantially no over-running.

While a preferred embodiment of this invention has been illustrated and described herein, it is to be understood that the invention is not limited thereby but is susceptible of change in form and detail within the scope of the appended claims.

I claim:

1. In a unit of the type described, the combination comprising a movably mounted motion receiving member, a movably mounted driven member, a prime mover for driving the driven member, and means for controlling the prime mover including two relatively movable, cooperating control elements and means actuated by the relative movement thereof for affecting the operation of the prime mover, means for effecting relative movement of the control elements upon relative movement between the motion receiving and driven members, and means mechanically connecting the prime mover and one of the control elements for modifying the relation of said control elements in accordance with the acceleration of the prime mover.

2. In a unit of the type described, the combination comprising a movably mounted motion receiving member, a movably mounted driven member, a prime mover for driving the driven member, and means for controlling the prime mover including two relatively movable, cooperating control elements and means actuated by the relative movement thereof for affecting the operation of the prime mover, means for effecting relative movement of the control elements upon relative movement between the motion receiving and driven members, and means mechanically connecting the prime mover and one of the control elements for advancing one of said control elements in accordance with the acceleration of the prime mover.

3. In a unit of the type described, the combination comprising a movably mounted motion receiving member, a movably mounted driven member, a prime mover for driving the driven member, and means for controlling the prime mover including two relatively movable, cooperating control elements and means actuated by the relative movement thereof for affecting the operation of the prime mover, means for effecting relative movement of the control elements upon relative movement between the motion receiving and driven members, and means mechanically connecting the prime mover and one of the control elements for modifying the relation of said control elements including means for creating a torque on one of said control elements proportional to the acceleration of the prime mover.

4. In a unit of the type described, the combination comprising a movably mounted motion receiving member, a movably mounted driven member, a prime mover for driving the driven member, and means for controlling the prime mover including two relatively movable, cooperating control elements and means actuated by the relative movement thereof for affecting the operation of the prime mover, operative connections between the motion receiving member and one of said control elements, operative connections between the prime mover and said other control element, and means in said connections between the prime mover and said other control element for advancing the latter in accordance with the acceleration of the prime mover.

5. In a unit of the type described, the combination comprising a movably mounted motion receiving member, a movably mounted driven member, an electrical prime mover for driving the driven member, and means controlling the prime mover including a follow-up magnet moving with said motion receiving member, follow-up coils in inductive relation with said magnet, means whereby said coils control the power supply to said prime mover, and means for moving said coils according to the movement of said prime mover and adapted to advance said coils with relation to said follow-up magnet a predetermined amount, depending upon the acceleration of said prime mover in either direction.

ARTHUR P. DAVIS.